US012763394B2

(12) United States Patent
Inagaki

(10) Patent No.: US 12,763,394 B2
(45) Date of Patent: Oct. 13, 2026

(54) COOLING STRUCTURE FOR VEHICLE BATTERY

(71) Applicant: SUBARU CORPORATION, Tokyo (JP)

(72) Inventor: Ryo Inagaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 645 days.

(21) Appl. No.: 18/216,034

(22) Filed: Jun. 29, 2023

(65) Prior Publication Data

US 2024/0039075 A1 Feb. 1, 2024

(30) Foreign Application Priority Data

Jul. 27, 2022 (JP) ................................ 2022-119688

(51) Int. Cl.
*H01M 10/625* (2014.01)
*H01M 10/613* (2014.01)
(Continued)

(52) U.S. Cl.
CPC ....... *H01M 10/625* (2015.04); *H01M 10/613* (2015.04); *H01M 10/6556* (2015.04);
(Continued)

(58) Field of Classification Search
CPC ............. H01M 10/625; H01M 10/613; H01M 10/6556; H01M 10/6563; H01M 10/6568; H01M 2220/20; H01M 10/617
See application file for complete search history.

(56) References Cited

U.S. PATENT DOCUMENTS

2014/0038020 A1* 2/2014 Murata ............... H01M 10/617 429/120
2014/0141298 A1* 5/2014 Michelitsch ........ H01M 10/647 429/71
(Continued)

FOREIGN PATENT DOCUMENTS

CN 110021801 A * 7/2019 ........ H01M 10/6563
CN 110435394 A * 11/2019 .......... H01M 10/613
JP 2015-82353 A 4/2015

OTHER PUBLICATIONS

Jaguemont, Joris, and Joeri Van Mierlo. "A comprehensive review of future thermal management systems for battery-electrified vehicles. ", 2020, Journal of Energy Storage, 31, 101551. (Year: 2020).*

*Primary Examiner* — Jessie Walls-Murray
*Assistant Examiner* — Lili Rassouli
(74) *Attorney, Agent, or Firm* — MCGINN IP LAW GROUP PLLC

(57) ABSTRACT

A cooling structure for a battery mounted on a vehicle includes a battery assembly, an air inlet, a heat exchanger, and a cooling passage. The battery assembly includes battery modules that are arranged along a front-rear direction of the vehicle. The air inlet is positioned on ahead of the battery assembly in the front-rear direction. The air inlet is configured to allow outside air to blow through the air inlet during traveling of the vehicle. The cooling passage is configured to allow a heating medium for cooling the battery modules to circulate between the battery assembly and the heat exchanger. The battery assembly is configured so that a battery module of the battery modules positioned closer to a rear of the vehicle in the front-rear direction is more cooled by the heating medium.

3 Claims, 8 Drawing Sheets

(51) Int. Cl.
*H01M 10/6556* (2014.01)
*H01M 10/6563* (2014.01)
*H01M 10/6568* (2014.01)

(52) U.S. Cl.
CPC ... *H01M 10/6563* (2015.04); *H01M 10/6568* (2015.04); *H01M 2220/20* (2013.01)

(56) References Cited

U.S. PATENT DOCUMENTS

| | | | | |
|---|---|---|---|---|
| 2014/0287284 | A1* | 9/2014 | Shibata | H01M 10/625 429/72 |
| 2015/0004458 | A1* | 1/2015 | Lee | H01M 10/613 429/120 |
| 2021/0247145 | A1* | 8/2021 | Vakilimoghaddam | F28D 1/0341 |
| 2022/0379682 | A1* | 12/2022 | Ohta | B60H 1/00278 |

* cited by examiner

COOLING STRUCTURE FOR VEHICLE BATTERY

CROSS-REFERENCE TO RELATED APPLICATIONS

The present application claims priority from Japanese Patent Application No. 2022-119688 filed on Jul. 27, 2022, the entire contents of which are hereby incorporated by reference.

BACKGROUND

The disclosure relates to a cooling structure for a vehicle battery.

Some existing vehicles having a battery pack mounted as a power source are known. Battery packs tend to relatively greatly increase in temperature of battery modules in charging and discharging, and therefore, a cooling system is normally provided in order to avoid deterioration due to temperature rise. Such a cooling system can easily cause temperature differences among multiple battery modules in a battery pack. In view of this, techniques for decreasing temperature differences among battery modules to reduce variations in battery life have been devised.

In one example, Japanese Unexamined Patent Application Publication (JP-A) No. 2015-82353 discloses a cooling mechanism for cooling secondary batteries. The cooling mechanism includes a first coolant path and a second coolant path that are arranged so as to provide flows in mutually opposite directions. The first coolant path and the second coolant path are coupled to respective outside coolant paths.

SUMMARY

An aspect of the disclosure provides a cooling structure for a battery mounted on a vehicle. The cooling structure includes a battery assembly, an air inlet, a heat exchanger, and a cooling passage. The battery assembly includes battery modules that are arranged along a front-rear direction of the vehicle. The air inlet is positioned ahead of the battery assembly in the vehicle front-rear direction. The air inlet is configured to allow outside air to blow through the air inlet during traveling of the vehicle. The cooling passage is configured to allow a heating medium for cooling the battery modules to circulate between the battery assembly and the heat exchanger. The battery assembly is configured so that a battery module of the battery modules positioned on closer to a rear of the vehicle in the vehicle front-rear direction is more cooled by the heating medium.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

Figure 1:
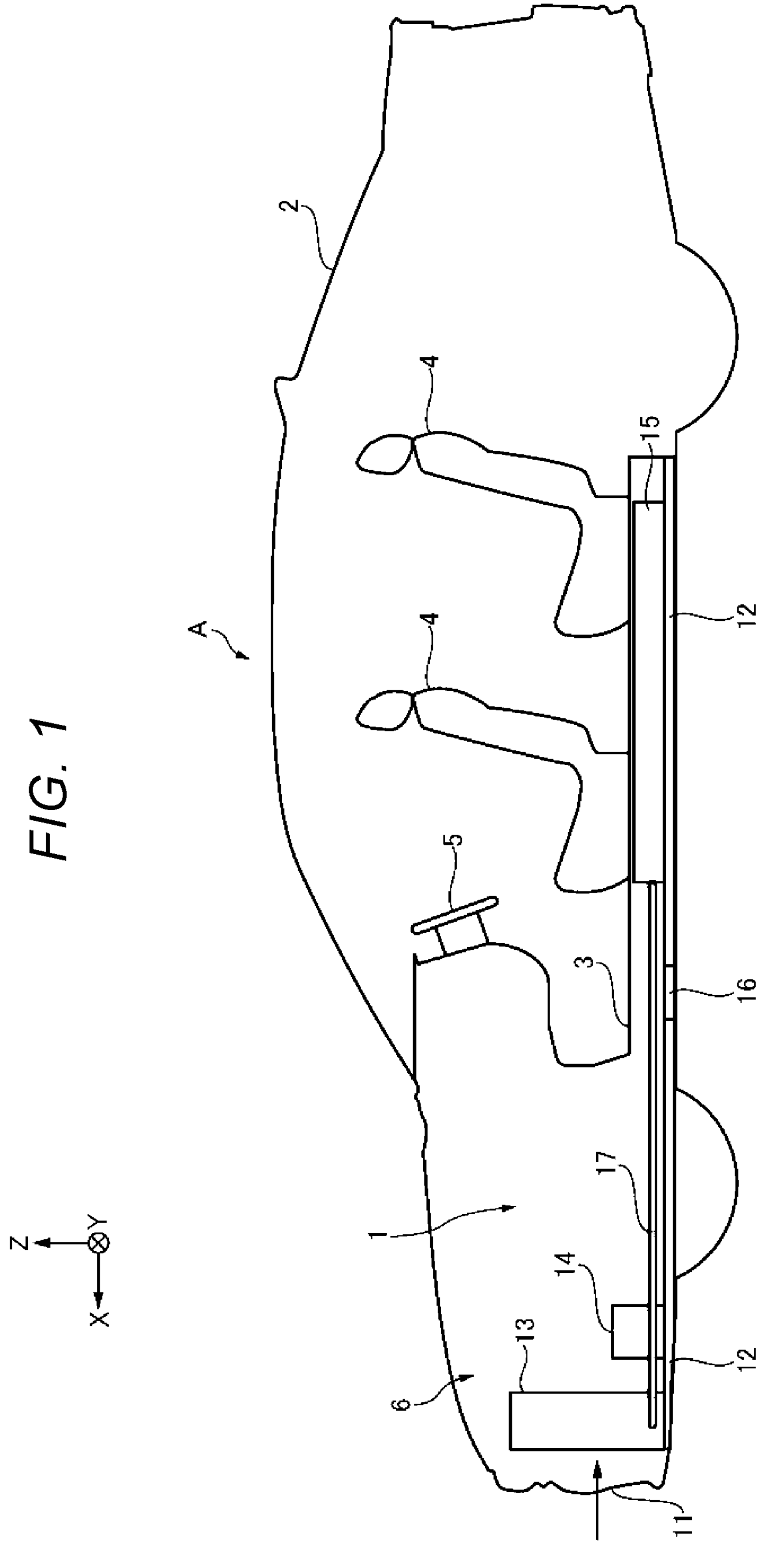
FIG. 1 is a schematic side view illustrating an example of a vehicle mounted with a battery cooling structure of a first embodiment.

The cooling mechanism disclosed in JP-A No. 2015-82353 has a complicated structure that includes the coolant paths. Such a cooling mechanism that is set in a housing (case) of a battery pack increases weight of the battery pack and manufacturing cost.

The disclosure has been developed in order to cope with these situations, and it is desirable to provide a cooling structure for a vehicle battery, which has a simple configuration but is able to decrease temperature differences among battery modules to reduce variations in battery life.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Each drawing illustrates arrows X, Y, and Z. The direction indicated by the arrow X (hereinafter also referred to as an "X direction") is a forward direction (vehicle advancing direction) in a vehicle front-rear direction of a vehicle A. The direction indicated by the arrow Y (hereinafter also referred to as a "Y direction") is a right direction in a vehicle width direction (right-left direction) of the vehicle A. The direction indicated by the arrow Z (hereinafter also referred to as a "Z direction") is an upper direction in an upper-lower direction (height direction) of the vehicle A. The direction opposite to the X direction is a rearward direction (vehicle reversing direction) in the vehicle front-rear direction of the vehicle A. The direction opposite to the Y direction is a left direction in the vehicle width direction of the vehicle A. The direction opposite to the Z direction is a lower direction in the upper-lower direction (height direction) of the vehicle A.

In each drawing, a front side is a side in the X direction (side in the forward direction), whereas a rear side is a side in the direction opposite to the X direction (side in the rearward direction). A right side is a side in the Y direction (side in the right direction), whereas a left side is a side in the direction opposite to the Y direction (side in the left direction). An upper side is a side in the Z direction (side in the upper direction), whereas a lower side is a side in the direction opposite to the Z direction (side in the lower direction). In addition, front and rear, right and left, and up and down respectively represent front and rear in the vehicle front-rear direction of the vehicle A, right and left in the vehicle width direction of the vehicle A, and up and down in the upper-lower direction (height direction) of the vehicle A.

First Embodiment

First, a first embodiment of a cooling structure for a vehicle battery (battery cooling structure) according to the disclosure (first embodiment) will be described. FIG. 1 illustrates a vehicle A that is mounted with a battery cooling structure 1 of the first embodiment. The vehicle A is an electric vehicle (EV), which is an example of a vehicle using a battery as a power source. The vehicle A is not limited thereto, and it can be any type of vehicle that has a battery as a power source, such as a hybrid vehicle or a fuel cell electric vehicle.

Figure 2:
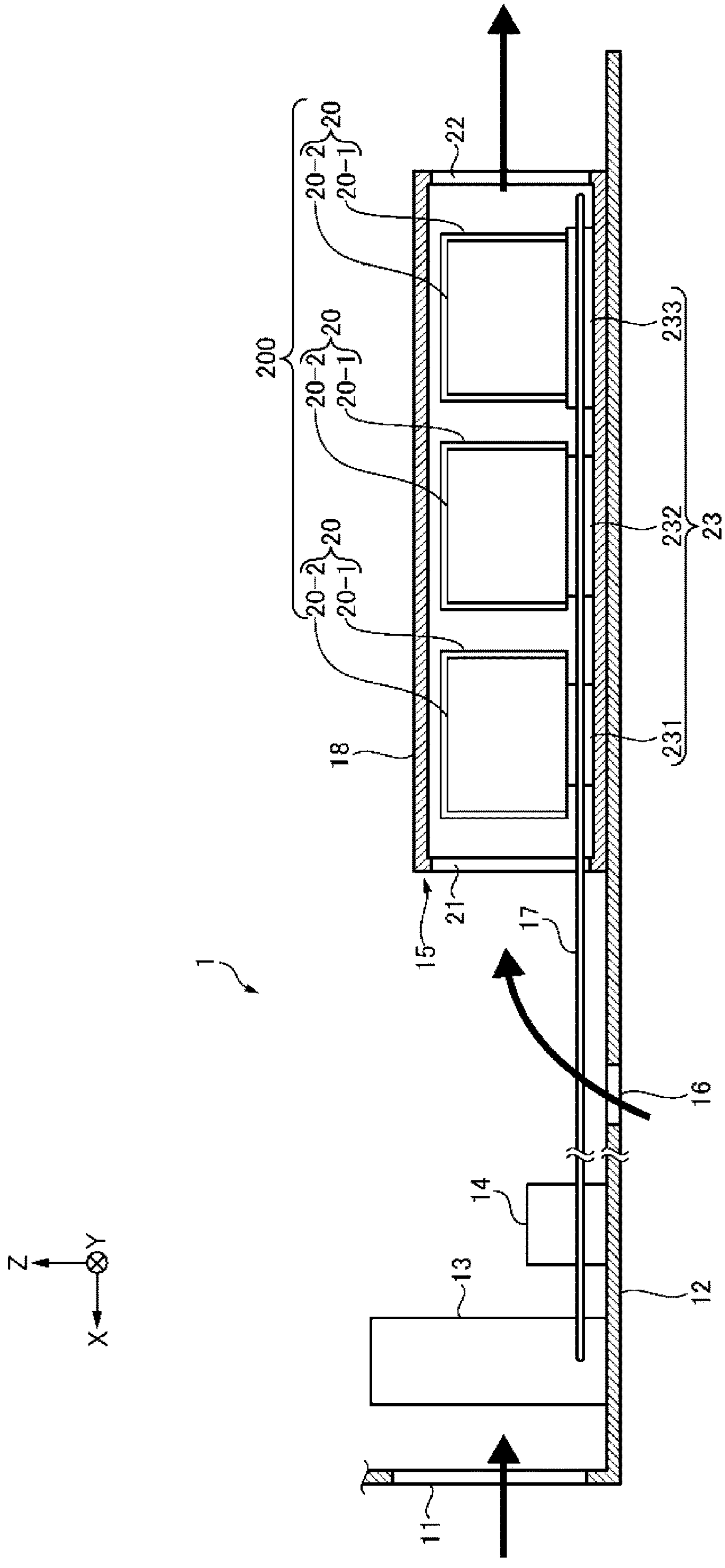
FIG. 2 is a schematic side view illustrating an example of the battery cooling structure of the first embodiment.

As illustrated in FIG. 1, the vehicle A is provided with seats 4, including a driver's seat, on a floor panel 3 in a vehicle body 2. The vehicle body 2 is provided with a steering wheel 5 for driving, and an engine, a motor, a control unit, etc., which are not illustrated. The battery cooling structure 1 includes a front grille opening (intake port) 11 positioned at the most front part of the vehicle body 2, a heat exchanger 13, a pump 14, a battery pack (battery housing) 15, an air inlet 16 formed at a bottom (under cover) 12, and a cooling passage 17. The heat exchanger 13 and the pump 14 are placed on the bottom 12 in a front section 6. As illustrated in FIGS. 1 and 2, the battery pack 15 is mounted on the bottom 12 under the floor panel 3 (that is, under the floor). The battery pack 15 has a housing (case) 18 that is fixed to the bottom 12 by bolts or the like, which are not illustrated.

Figure 3:
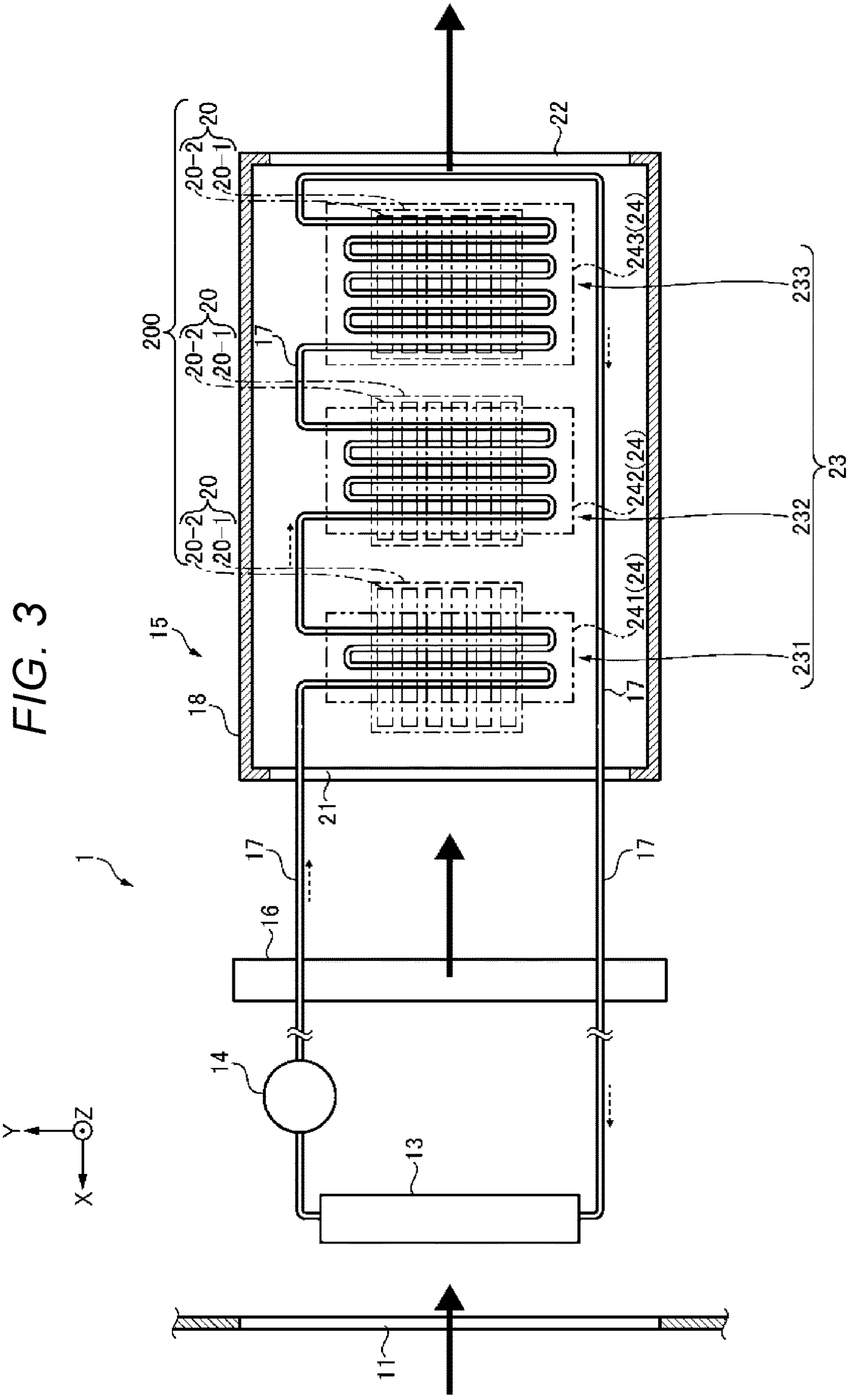
FIG. 3 is a schematic top view illustrating the example of the battery cooling structure of the first embodiment.

As illustrated by the solid arrows in FIGS. 2 and 3, the battery cooling structure 1 takes in outside air from the front grille opening (intake port) 11 on the front side in the vehicle front-rear direction and discharges the outside air from the rear side in the vehicle front-rear direction. The bottom 12 has the air inlet 16 that is formed on a front side, in the vehicle front-rear direction, of the battery pack (battery housing) 15.

The cooling passage 17 has a tube shape and couples the heat exchanger 13 in the front section 6 and a battery assembly 200 in the battery pack (battery housing) 15 to each other. The battery assembly 200 will be described later.

The heat exchanger 13 is coupled to the pump 14 via the cooling passage 17. The pump 14 is coupled to a passage plate 231 via the cooling passage 17. Moreover, the heat exchanger 13 is also coupled to a passage plate 233 via the cooling passage 17.

The heat exchanger 13 is, for example, a radiator. The heat exchanger (radiator) 13 is disposed to face the front grille opening (intake port) 11 at a front surface and to face the battery pack 15 at a rear surface. The posture of the disposed heat exchanger 13 is not limited thereto, and it can be changed as appropriate.

The battery pack 15 contains the battery assembly 200 in the housing (case) 18. The battery assembly 200 includes multiple battery modules 20 that are arranged along the vehicle front-rear direction. The housing 18 of the battery pack 15 has a box shape with a length in the front-rear direction that is longer than the length in the right-left direction. The housing 18 has a front opening 21 at a front side surface and a rear opening 22 at a rear side surface.

During traveling of the vehicle A, outside air (travel wind) blows into the front section 6 of the vehicle body 2 from the front grille opening (intake port) 11 and hits the front surface of the heat exchanger (radiator) 13, and it then passes through a core part (radiator core; not illustrated) inside the heat exchanger 13, to the back surface of the heat exchanger 13. At this time, the heat exchanger 13 performs heat exchange between the travel wind and a heating medium to cool the heating medium. The words "during traveling" mean that the vehicle A is in the midst of traveling in the front direction (vehicle advancing direction or X direction).

Both of the travel wind that passes through the heat exchanger 13 after blowing into a space between the floor of the vehicle body 2 and the bottom (under cover) 12 from the front grille opening (intake port) 11, and travel wind that blows into this space from the air inlet 16, flow in the vehicle reversing direction. The travel wind flows from the front opening 21 of the battery pack 15 into the housing 18 and then passes through while coming into contact with the battery modules 20, and it flows out of the housing 18 from the rear opening 22 to be discharged to the outside of the vehicle A.

The pump 14 in operation circulates the heating medium in the cooling passage 17. The pump 14 is, for example, a water pump, but not limited thereto, and it can be any pump. The heating medium is, for example, water, but not limited thereto, and it can be another liquid. For example, the heating medium may be coolant (cooling water).

In response to the pump 14 being actuated, water, which is the heating medium, is cooled by the heat exchanger (radiator) 13 and flows in the cooling passage 17, in a direction indicated by the dotted arrows in FIG. 3, and it then enters the housing 18 of the battery pack 15. In the housing 18, the water, which is a heating medium, is heated by heat transfer from the battery modules 20. The water that is heated in the housing 18 returns to the heat exchanger 13 through the cooling passage 17, as indicted by the dotted arrows.

As illustrated in FIGS. 2 and 3, the battery module 20 contains six battery cells 20-2 in a battery case 20-1. The battery case 20-1 has a structure for allowing air to enter and go out therefrom. In the battery case 20-1, the circumferences except for bottom surfaces of the battery cells 20-2 have clearances from the battery case 20-1. The six battery cells 20-2 are arranged in parallel with intervals therebetween, in a direction approximately orthogonal to the flow of travel wind (that is, in the right-left direction).

As illustrated in FIG. 3, three battery modules 20 having such a structure are arranged at intervals along the vehicle front-rear direction, in the housing 18 of the battery pack 15. That is, in the battery pack 15, eighteen battery cells 20-2 are arranged at intervals so as to allow air to pass therethrough.

During traveling of the vehicle A, travel wind, which blows into the housing 18 of the battery pack 15, flows through the intervals such as between the parallel-arranged battery cells 20-2 and between the battery cells 20-2 and the battery case 20-1, to blow out in the vehicle reversing direction. The battery cells 20-2 are cooled by the travel wind that passes.

The battery cell 20-2 is, for example, an all-solid-state battery cell. The all-solid-state battery cell is obtained by solidifying a mixture of powder of an anode active material, powder of a cathode active material, and powder of a solid electrolyte, and it is a battery that is able to be controlled in temperature within a temperature range of travel wind. The battery cell 20-2 is not limited thereto, and it can be a cell of another battery. For example, the battery cell 20-2 may be a lithium ion battery cell.

The number of the battery cells 20-2 that are arranged in the right-left direction in the battery module 20 is not limited thereto, and it may be one or more. In addition, the number of the battery modules 20 for constituting the battery assembly 200, which are arranged in the front-rear direction in the housing 18, is not limited thereto, and it may be one or more.

Water, which is a heating medium for cooling the battery modules 20, circulates between the battery assembly 200 and the heat exchanger 13, in the cooling passage 17. Passage plates 23 that partially constitute the cooling passage 17 are provided in the housing 18 of the battery pack 15. The sectional areas of cross sections at respective parts of the cooling passage 17 are approximately the same, but they are not limited thereto; they may not be the same.

The passage plate 23 has a plate part 24 that is formed with a tubular space partially constituting the cooling passage 17. The cooling passage 17 that is formed in the plate part 24 is zigzagged (bent) in such a manner as to provide multiple parallel rows.

The passage plate 23 faces the battery module 20, as illustrated in FIGS. 2 and 3. In one example, the passage plate 23 is in contact with a lower surface of the battery module 20. In the housing 18 of the battery pack 15, three passage plates 23 (passage plates 231 to 233) having such a structure are arranged along the vehicle front-rear direction. The passage plate 23 may be placed so as to face and be in contact with a surface other than the lower surface of the battery module 20.

The water that is heated by the battery pack 15 flows into the heat exchanger (radiator) 13 through the cooling passage 17. The heat exchanger 13 cools the water, which is a heating medium flowing thereinto through the cooling passage 17, by exchanging heat with travel wind that blows thereinto through the front grille opening (intake port) 11. The water that is cooled by the heat exchanger 13 flows into the inside of the passage plate 23 in the housing 18 of the battery pack 15, through the cooling passage 17.

The heat exchanger 13 may be another component instead of a radiator. The vehicle A is mounted with a heat pump air conditioning system, and the heat exchanger 13 may be a heat sink (evaporator) that is provided to this air conditioning system. When the heat sink is used as the heat exchanger 13, the vehicle A can sufficiently cool the water that flows into the heat exchanger 13 via the cooling passage 17, even in a situation in which no or insufficient travel wind is obtained, for example, during stop or low-speed driving of the vehicle A.

Travel wind that blows into the air inlet 16 rushes into the housing 18 of the battery pack 15 via the front opening 21, as illustrated by the solid arrows in FIGS. 2 and 3. Among the battery modules 20 in the housing 18, the battery module 20 on the passage plate 231, which is positioned on the most front side in the vehicle front-rear direction, is directly blown by the travel wind flowing into the housing 18.

In this manner, travel wind is taken from a front side of the battery module 20 in the space between the floor of the vehicle body 2 and the bottom 12, whereby a sufficient amount of travel wind hits the battery module 20 that is positioned on the most front side in the vehicle front-rear direction. Thus, the battery module 20 on the passage plate 231, which is positioned on the most front side in the front-rear direction in the housing 18 of the battery pack 15, is most cooled by the travel wind flowing into the housing 18.

On the other hand, the battery module 20 that is positioned rearward of the battery module 20 on the most front side is blocked by the battery module 20 on the front side thereof and is not hit by a sufficient amount of travel wind. Moreover, travel wind tends to increase in temperature by heat transfer from the battery module 20 and may have a smaller cooling effect, as advancing in the vehicle reversing direction (in the direction opposite to the X direction). For these reasons, the battery module 20 that is positioned on a more rear side in the vehicle front-rear direction is more hardly cooled by travel wind.

In addition, the water, which is a heating medium cooled by the heat exchanger 13, tends to increase in temperature by heat transfer from the battery module 20 there above, and may have a smaller cooling effect, as flowing in the vehicle reversing direction in the housing 18 of the battery pack 15.

The tendency that the temperature increases more in the battery module 20 on a more rear side in the vehicle front-rear direction due to these factors, is suppressed, whereby temperature differences among the battery modules 20 in the vehicle front-rear direction are decreased. For this purpose, the battery cooling structure 1 is configured so that the battery module 20 positioned on a more rear side in the vehicle front-rear direction will be more cooled by water circulating in the cooling passage 17, in the housing 18 of the battery pack 15.

In one example, in the battery cooling structure 1, the passage plate 23 that is positioned on a more rear side in the vehicle front-rear direction has a greater passage volume, in the order from the passage plate 231 to the passage plate 232 and to the passage plate 233, in the housing 18 of the battery pack 15. As illustrated in FIG. 3, the passage volume is increased by increasing the number of bent parts (number of wound parts) formed in the cooling passage 17 to extend the cooling passage 17, in the order from the passage plate 231 to the passage plate 232 and to the passage plate 233. Thus, the battery module 20 that is positioned on a more rear side in the vehicle front-rear direction faces the cooling passage 17 having a greater passage volume and is thereby more cooled by water, which is a heating medium.

In this manner, in the battery cooling structure 1, the battery module 20 that is positioned on a front side in the vehicle front-rear direction is cooled mainly by travel wind blowing through the air inlet 16. On the other hand, the battery cooling structure 1 is configured such that the battery module 20 positioned on a more rear side in the vehicle front-rear direction, which is hardly cooled by travel wind, faces the passage plate 23 having a greater passage volume so as to be more cooled.

The battery cooling structure 1 having such a simple configuration without a complicated cooling mechanism can decrease temperature differences among the battery modules 20 to reduce variations in battery life. In the battery cooling structure 1, the cooling effect of travel wind and the cooling effect of the heating medium are used together in cooling the battery modules 20, resulting in improving the cooling efficiency. Such a battery cooling structure 1 is useful, for example, when an all-solid-state battery cell, which is able to be controlled in temperature within a temperature range of travel wind, is used as the battery cell 20-2.

In the example illustrated in FIG. 3, the passage plate 23 in contact with the lower surface of the battery module 20 that is positioned on a more rear side in the vehicle front-rear direction, has a greater area of the plate part 24 (plate part 241, plate part 242, or plate part 243) in accordance with increase in the number of bending (number of winding) of the cooling passage 17, in the order from the passage plate

231 to the passage plate 232 and to the passage plate 233. This structure quickly cools a wide area of the battery module 20 that is positioned on a rear side in the vehicle front-rear direction. Instead of the structure of this example, the structure in the example in FIG. 4 may be used.

Figure 4:
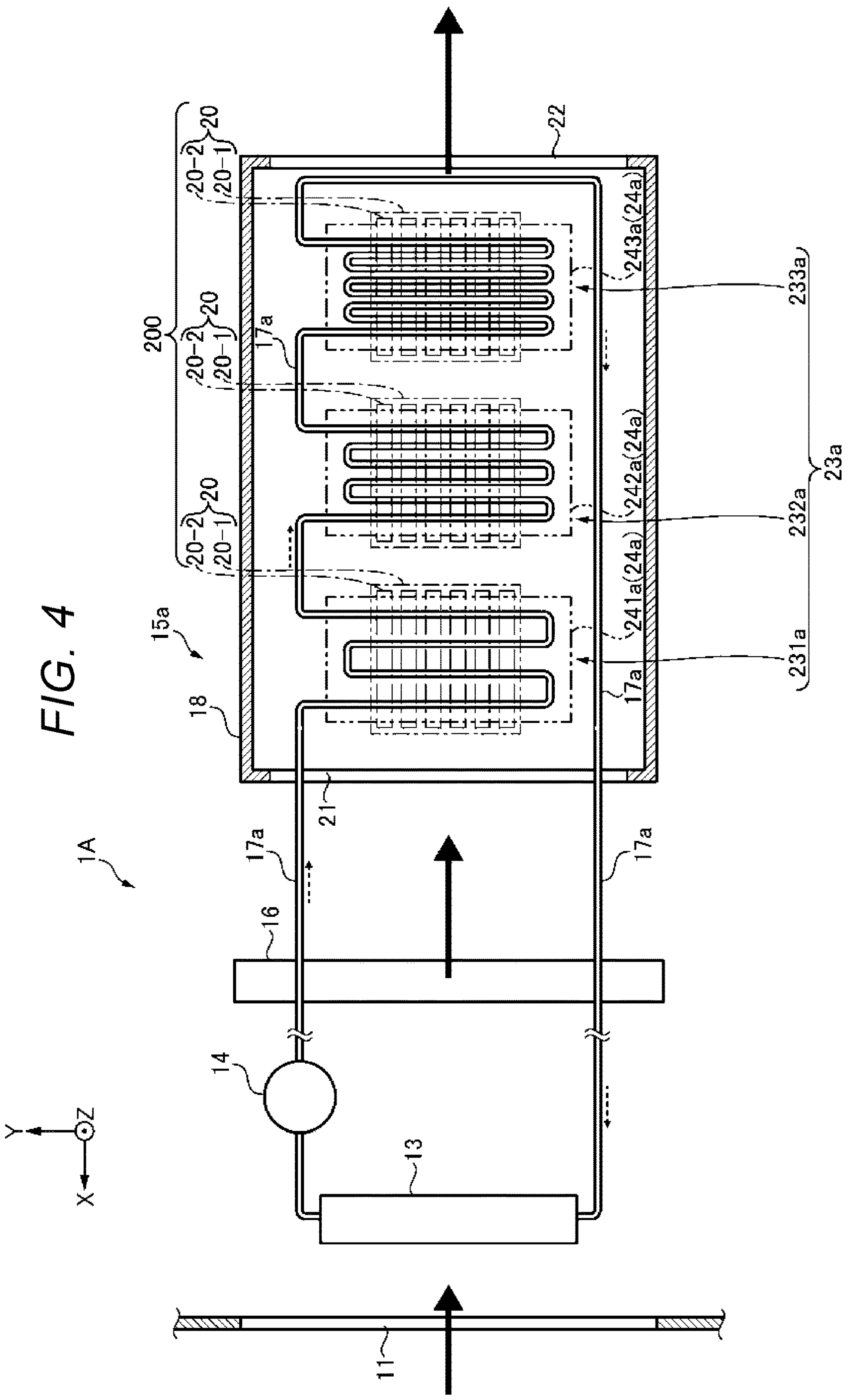
FIG. 4 is a schematic top view illustrating a modified example of the battery cooling structure of the first embodiment.

FIG. 4 illustrates a battery cooling structure 1A that has a similar structure as follows: in the housing 18 of a battery pack 15*a*, a passage plate 23*a* in contact with the battery module 20 that is positioned on a more rear side in the vehicle front-rear direction, has a larger number of bent parts (number of wound parts) formed in a cooling passage 17*a*, and it thereby has a greater passage volume, in the order from a passage plate 231*a* to a passage plate 232*a* and to a passage plate 233*a*.

In the battery cooling structure 1A, the area of a plate part 24*a* (plate part 241*a*, plate part 242*a*, or plate part 243*a*) is not increased as the passage plate 23*a* goes from the passage plate 231*a* to the passage plate 232*a* and to the passage plate 233*a*, but the areas thereof are made approximately the same. Under these conditions, the interval between the parallel bent (wound) parts of the cooling passage 17*a* is more narrowed to form a more densely wound cooling passage 17*a*, whereby the passage volume is increased, in the order from the passage plate 231*a* to the passage plate 232*a* and to the passage plate 233*a*.

In this manner, the battery cooling structure 1A having a simple configuration can decrease temperature differences among the battery modules 20 to reduce variations in battery life. In the battery cooling structure 1A, the cooling effect of travel wind and the cooling effect of the heating medium are used together in cooling the battery modules 20, resulting in improving the cooling efficiency. In addition, the battery cooling structure 1A includes the plate parts 24*a* that have approximately the same area, instead of areas changed in accordance with the number of windings of the cooling passage 17*a* in the passage plate 23*a*. Thus, it is possible to use plate parts 24*a* that have the same form (have the same shape and area).

Second Embodiment

Figure 5:
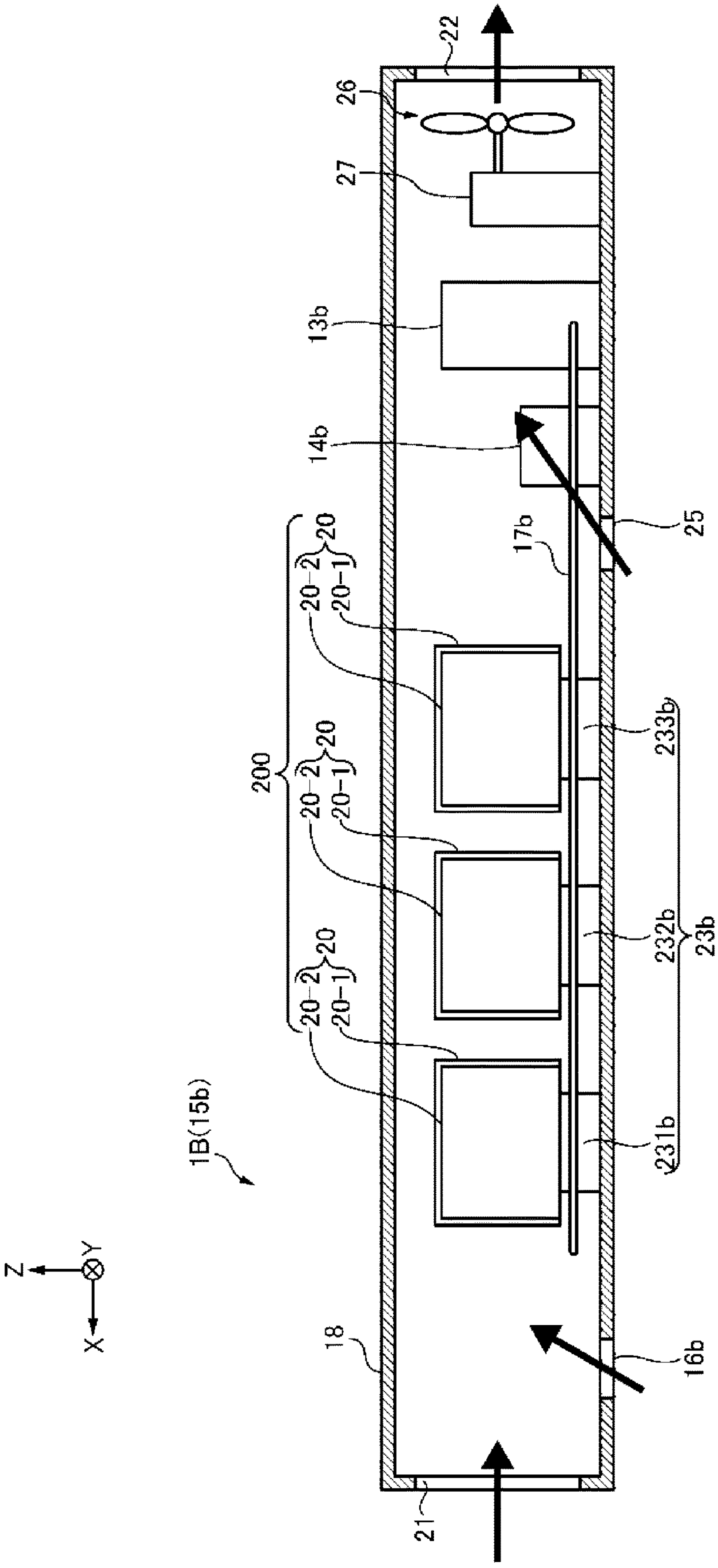
FIG. 5 is a schematic side view illustrating an example of a battery cooling structure of a second embodiment.
Figure 6:
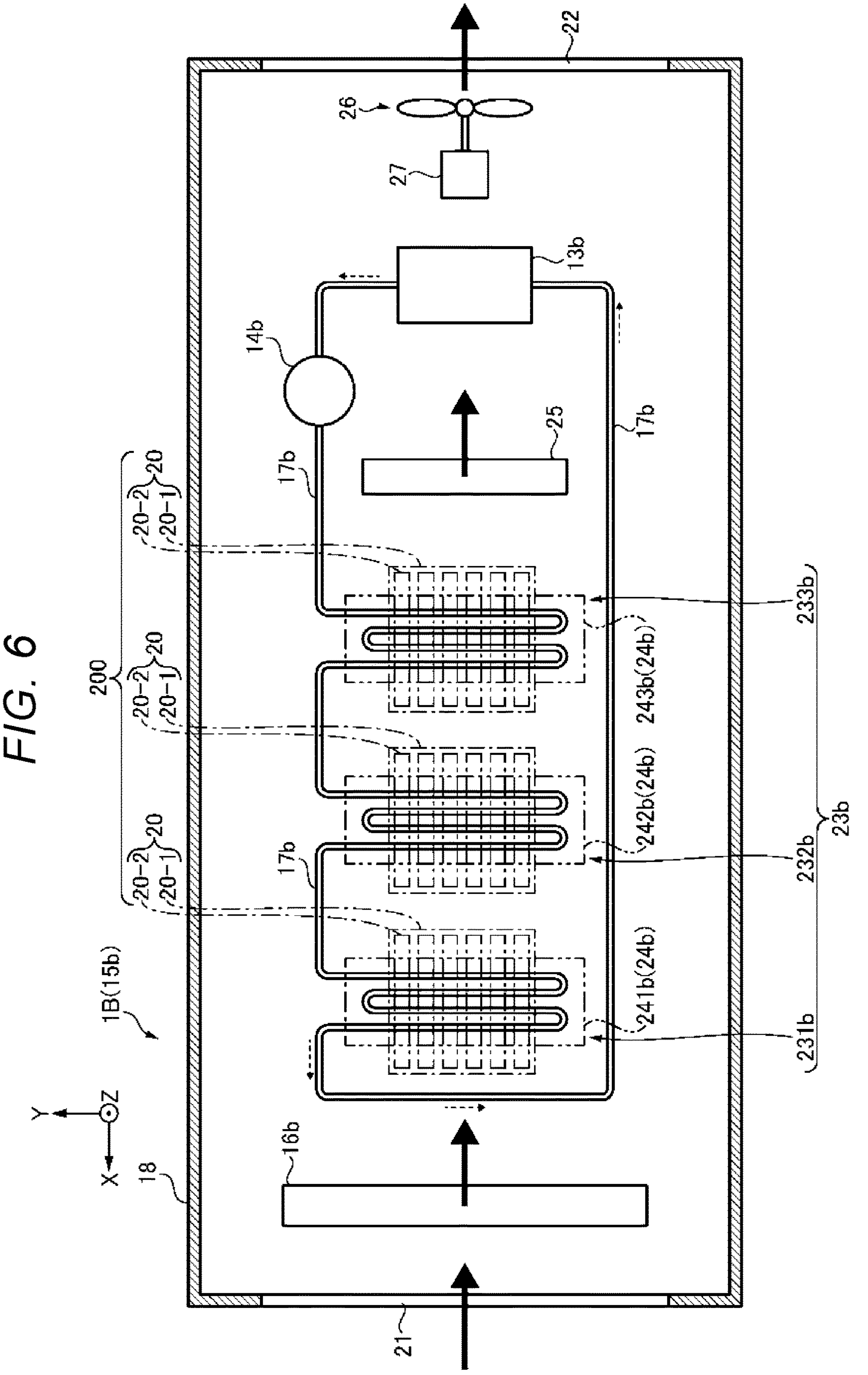
FIG. 6 is a schematic top view illustrating the example of the battery cooling structure of the second embodiment.

Next, a second embodiment of a cooling structure for a vehicle battery (battery cooling structure) of the disclosure (second embodiment) will be described. As illustrated in FIGS. 5 and 6, a battery cooling structure 1B of the second embodiment includes a battery pack 15*b* that is placed at the same position as the battery pack 15 of the first embodiment. The battery pack 15*b* that constitutes the battery cooling structure 1B includes, in addition to the battery assembly 200, a heat exchanger (radiator) 13*b*, a pump 14*b*, a fan 26, and a motor 27, in the housing 18. In addition, a cooling passage 17*b* that couples the heat exchanger 13*b* and the battery assembly 200 is provided in the housing 18. The heat exchanger (radiator) 13*b* is, for example, smaller in size than the heat exchanger (radiator) 13, and the pump 14*b* is, for example, smaller in size than the pump 14.

The heat exchanger 13*b* is coupled to the pump 14*b* via the cooling passage 17*b*. The pump 14*b* is coupled to a passage plate 233*b* via the cooling passage 17*b*. Moreover, the heat exchanger 13*b* is also coupled to a passage plate 231*b* via the cooling passage 17*b*.

The housing 18 of the battery pack 15*b* is formed with an air inlet 16*b* and a secondary air inlet 25 at a bottom surface. The air inlet 16*b* is formed on a front side, in the vehicle front-rear direction, of the battery assembly 200, at the bottom surface of the housing 18.

The heat exchanger (radiator) 13*b* is placed on a rear side, in the vehicle front-rear direction, of the battery assembly 200. The heat exchanger 13*b* at this position is hardly hit by travel wind that blows through the front opening 21 at the front side surface of the housing 18. In view of this, the secondary air inlet 25 through which travel wind blows is provided to the bottom surface of the housing 18 between the battery assembly 200 and the heat exchanger 13*b* in the vehicle advancing direction. With this structure, travel wind that blows through the secondary air inlet 25 into the housing 18 advances to hit the heat exchanger 13*b*.

In the battery pack 15*b* constituting the battery cooling structure 1B, passage plates 23*b* (passage plate 231*b*, passage plate 232*b*, and passage plate 233*b*) having approximately the same form with each other are arranged under the battery assembly 200. That is, plate parts 24*b* (plate part 241*b*, plate part 242*b*, and plate part 243*b*) have approximately the same form, and parts of the cooling passage 17*b* there inside have approximately the same shape (e.g., the number of bending and the interval between the parallel bent parts of the cooling passage 17*b*).

During traveling of the vehicle A, in the battery pack 15*b*, travel winds that blow into the housing 18 through the front opening 21 at the front side surface of the housing 18, and through the air inlet 16*b* and the secondary air inlet 25 at the bottom surface of the housing 18, flow from the front side to the rear side in the vehicle front-rear direction, as illustrated by the solid arrows in FIGS. 5 and 6.

The battery module 20 that is positioned on the most front side, in the front-rear direction, of the battery assembly 200 is directly blown by travel winds that blow into the housing 18 from the front opening 21 and the air inlet 16*b*, and thus, it is sufficiently cooled by these travel winds.

Also, in the battery cooling structure 1B (battery pack 15*b*), the cooling effect of travel wind is decreased by heat transfer from the battery module 20, as the travel wind advances in the vehicle reversing direction (in the direction opposite to the X direction). For this reason, also in the battery cooling structure 1B, the battery module 20 that is positioned on a more rear side in the vehicle front-rear direction is more hardly cooled by travel wind.

In the battery cooling structure 1B, water that is heated by the battery modules 20 of the battery assembly 200 flows through the cooling passage 17*b* into the heat exchanger 13*b* that is on a rear side, in the vehicle front-rear direction, of the battery assembly 200. The heat exchanger 13*b* cools the water that flows thereinto, by exchanging heat with travel wind blowing thereto through the secondary air inlet 25.

As illustrated by the dotted arrows in FIG. 6, the water that is cooled by the heat exchanger 13*b* successively flows to the passage plate 233*b*, the passage plate 232*b*, and the passage plate 231*b* under the battery assembly 200, through the cooling passage 17*b*. The water that flows through in the cooling passage 17*b* of the passage plate 233*b* is water that is cooled by the heat exchanger 13*b* and then flows directly thereinto, and it thereby has a sufficient cooling effect. As the water in the cooling passage 17*b* advances in the vehicle advancing direction from the passage plate 233*b* to the passage plate 232*b* and to the passage plate 231*b*, it tends to be increased in temperature by heat transfer from the battery modules 20, which are positioned there above, and it may have a smaller cooling effect.

In this manner, in the battery pack 15*b* constituting the battery cooling structure 1B, the heat exchanger 13*b* is disposed on a rear side, in the vehicle front-rear direction, of the battery assembly 200, and the water that is cooled by the heat exchanger 13*b* is made to flow from the rear side to the front side in the vehicle front-rear direction. Thus, the battery module 20 constituting the battery assembly 200 and being positioned on a more rear side in the vehicle front-rear direction, is more cooled by water in the cooling passage 17*b*.

In the battery pack 15*b* constituting the battery cooling structure 1B as described above, the battery module 20 on the passage plate 231*b*, which is positioned on a front side in the vehicle front-rear direction, is cooled mainly by travel wind, in the housing 18. On the other hand, the battery module 20 on the passage plate 233*b*, which is positioned on a rear side in the vehicle front-rear direction, is hardly cooled by travel wind, but instead, it is cooled mainly by water in the cooling passage 17*b*. Thus, the battery cooling structure 1B can decrease temperature differences among the battery modules 20 in the vehicle front-rear direction to reduce variations in battery life.

The battery pack 15*b* constituting the battery cooling structure 1B includes the fan 26 and the motor 27 for rotationally driving the fan 26, on a rear side, in the vehicle front-rear direction, of the heat exchanger 13*b* in the housing 18. In the battery cooling structure 1B, even in a situation in which no or insufficient travel wind is obtained, for example, during stop or low-speed driving of the vehicle A, outside air blows through the secondary air inlet 25 to the heat exchanger 13*b* due to rotation driving of the fan 26 based on operation of the motor 27.

Thus, even in such a situation, the heat exchanger 13*b* is able to cool the water, which is a heating medium, by using outside air blowing thereinto. The battery module 20 that is positioned on a rear side, in the vehicle front-rear direction, of the battery assembly 200, is sufficiently cooled by the water that is cooled by the heat exchanger 13*b* and then flows directly in the cooling passage 17*b* formed in the passage plate 23*b* under this battery module 20.

In the battery cooling structure 1B, rotation driving of the fan 26 causes outside air to blow through the front opening 21 and the air inlet 16*b*. With this structure, even in a situation in which no or insufficient travel wind is obtained, such as during stop or low-speed driving of the vehicle A, the battery module 20 that is positioned on a front side in the vehicle front-rear direction in the housing 18 of the battery pack 15*b* is sufficiently cooled by this outside air. Thus, even in a situation in which no or insufficient travel wind is obtained, such as during stop or low-speed driving of the vehicle A, the battery cooling structure 1B can decrease temperature differences among the battery modules 20, in the vehicle front-rear direction.

As described above, the battery cooling structure 1B having a simple configuration can decrease temperature differences among the battery modules 20 to reduce variations in battery life. Moreover, in the battery cooling structure 1B, the cooling effect of travel wind and the cooling effect of the heating medium are used together in cooling the battery modules 20, resulting in improving the cooling efficiency. Even in a situation in which no or insufficient travel wind is obtained, the battery cooling structure 1B decreases temperature differences among the battery modules 20 to reduce variations in battery life by rotationally driving the fan 26.

Other Examples

Embodiments of the disclosure are not limited to the examples described above. A battery cooling structure 1C in FIG. 7 is different from the battery cooling structure 1 and includes parts of a cooling passage 17*c* that have approximately the same shape (e.g., the number of bending and the interval between the parallel bent parts of the cooling passage 17*c*), in the passage plates 23*c* in the housing 18 of a battery pack 15*c*.

Under these conditions, in the battery cooling structure 1C, the passage plates 23*c* have respective plate parts 24*c* that are made of a thermally conductive material. The thermally conductive material that forms the plate part 24*c* is not particularly limited, but for example, a metal material having a high thermal conductivity, such as aluminum, copper, or iron, may be used.

The plate part 24*c*, which is a thermally conductive material, is cooled as a whole by heat transfer from water in the cooling passage 17*c*. Thus, as a contact area with the plate part 24*c* that is in contact with a lower surface of the battery module 20 increases, the battery module 20 is more cooled by heat transfer from the plate part 24*c*.

Figure 7:
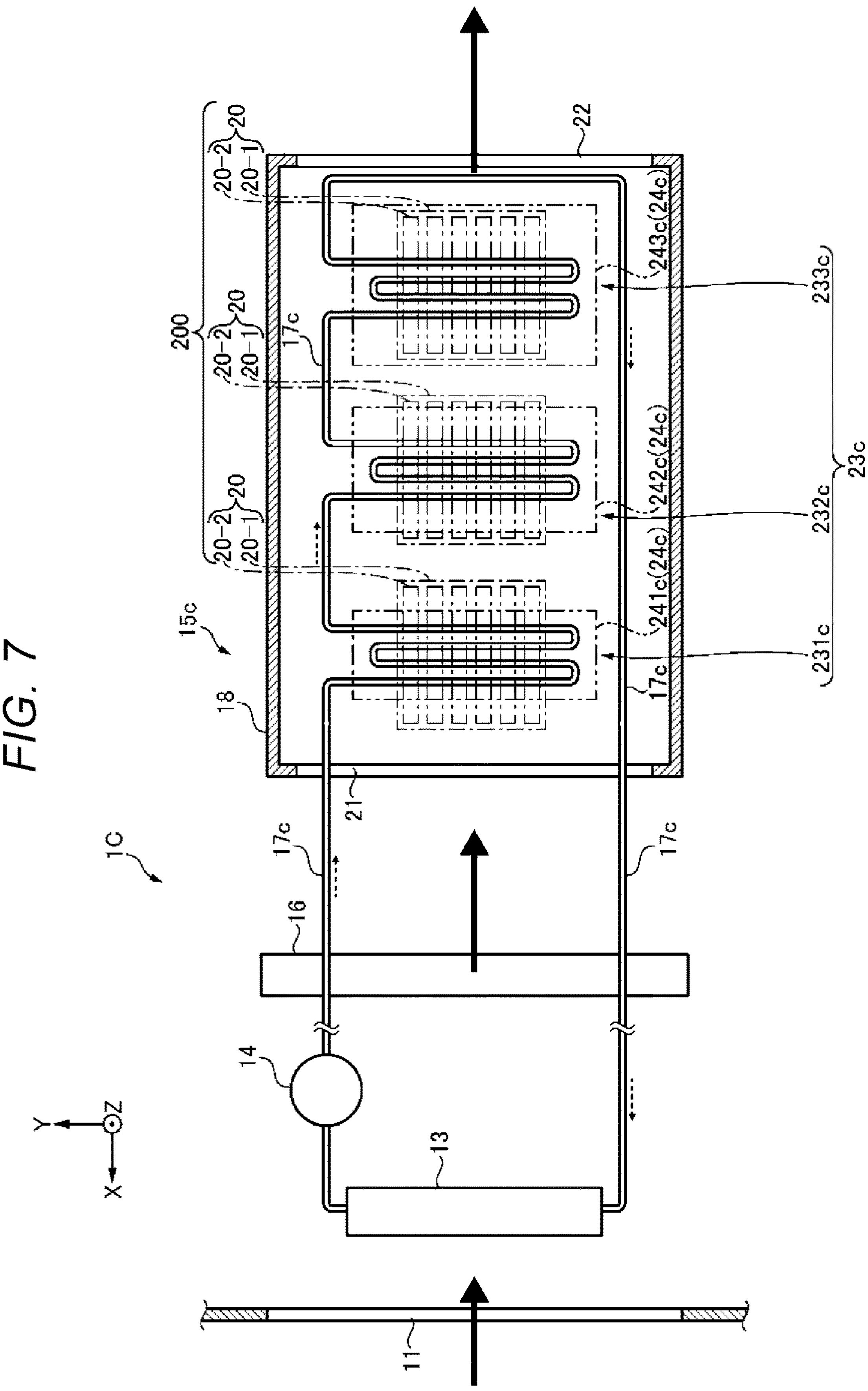
FIG. 7 is a schematic top view illustrating a modified example of the battery cooling structure of the first embodiment.

As illustrated in FIG. 7, in the battery pack 15*c*, the area of the plate part 24*c* of the passage plate 23*c* positioned on a more rear side in the vehicle front-rear direction is greater, and the contact area with the battery module 20 also increases accordingly, in the order from a plate part 241*c* of a passage plate 231*c* to a plate part 242*c* of a passage plate 232*c* and to a plate part 243*c* of a passage plate 233*c*. With this structure, a battery assembly 200 of the battery cooling structure 1C is more cooled by heat transfer from the plate part 24*c* made of a thermally conductive material, in the order from the battery module 20 on the passage plate 231*c* to the battery module 20 on the passage plate 232*c* and to the battery module 20 on the passage plate 233*c*.

In this manner, in the battery cooling structure 1C, it is possible to increase the cooling effect of the passage plate 23*c* by simply using a thermally conductive material as the plate part 24*c* and increasing the area of the plate part 24*c*, without changing the shape of the cooling passage 17*c* to be formed in the passage plate 23*c*. Thus, the battery cooling structure 1C having a simpler configuration can decrease temperature differences among the battery modules 20 to reduce variations in battery life and can also reduce manufacturing cost. Moreover, also in the battery cooling structure 1C, the cooling effect of travel wind and the cooling effect of the heating medium are used together in cooling the battery modules 20, resulting in improving the cooling efficiency.

Figure 8:
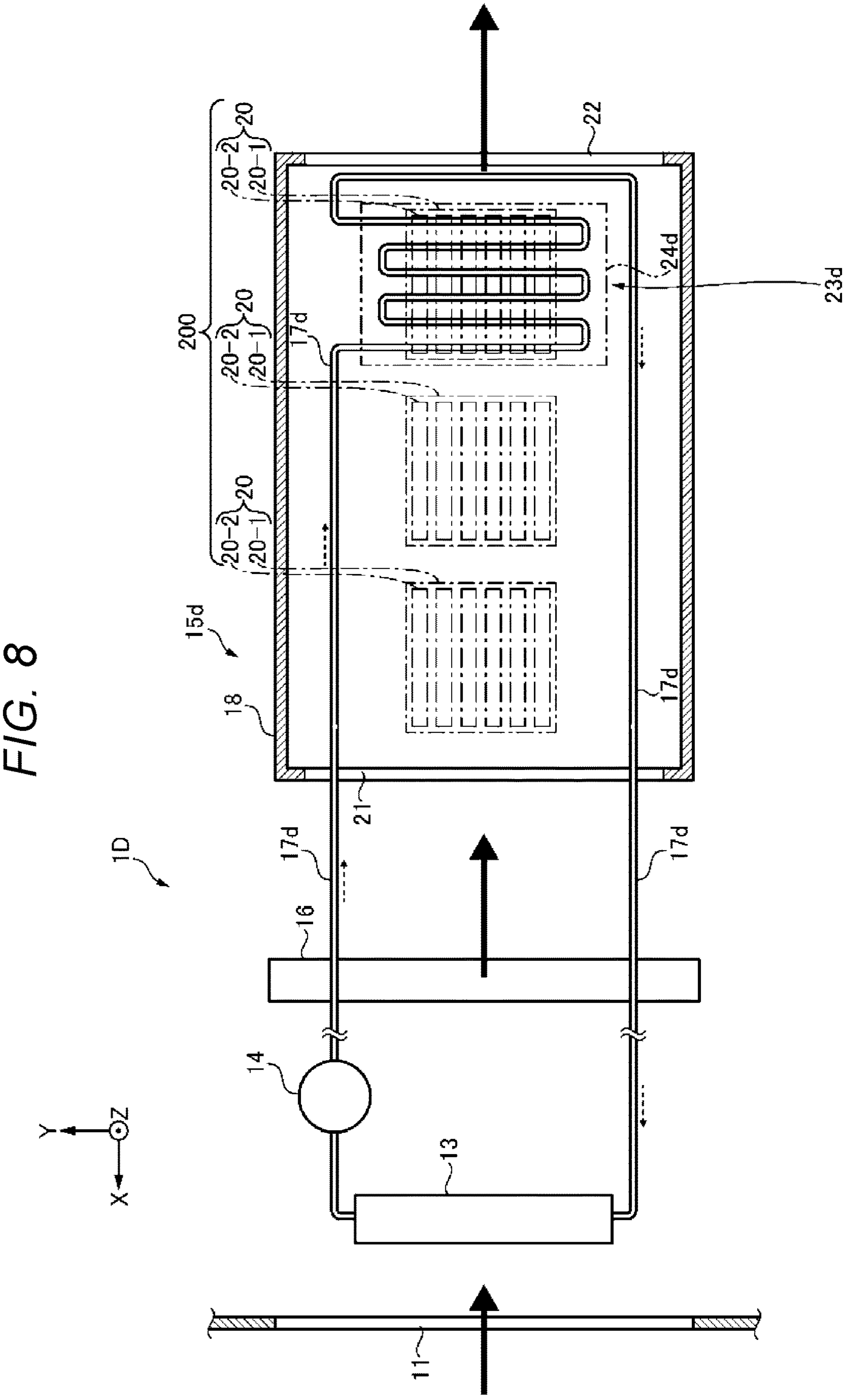
FIG. 8 is a schematic top view illustrating a modified example of the battery cooling structure of the first embodiment.

A battery cooling structure 1D in FIG. 8 is different from the battery cooling structure 1 and includes a passage plate 23*d* that is formed with a cooling passage 17*d* in a plate part 24*d*, under a battery module 20 positioned on the most rear side in the vehicle front-rear direction, in the housing 18 of a battery pack 15*d*. In this manner, in the battery cooling structure 1D, the battery module 20 that is most hardly cooled by travel wind blowing from a front side, is cooled by water in the cooling passage 17*d*.

The battery cooling structure 1D, which has a reduced number of passage plates 23*d* and thereby has a simpler configuration, can decrease temperature differences among the battery modules 20 to reduce variations in battery life and can also reduce manufacturing cost. It is also possible to reduce weight of the battery cooling structure 1D by decreasing the number of passage plates 23*d*. Moreover, also in the battery cooling structure 1D, the cooling effect of travel wind and the cooling effect of the heating medium are used together in cooling the battery modules 20, resulting in improving the cooling efficiency.

In the battery cooling structures 1, 1A, 1B, and 1D, the plate parts 24, 24*a*, 24*b*, and 24*d* may be made of thermally conductive materials. In this case, the cooling effects of the passage plates 23, 23*a*, 23*b*, and 23*d* on the battery modules 20 are more improved.

In the battery cooling structures 1, 1A, 1C, and 1D, the fan 26 and the motor 27 may be provided on a rear side, in the vehicle front-rear direction, of the air inlet 16 (for example, on a rear side of the housing 18). This enables the battery cooling structures 1, 1A, 1C, and 1D to take outside air through the air inlet 16 into the space between the floor of the vehicle body 2 and the bottom 12, even in a situation in which no or insufficient travel wind is obtained, for example, during stop or low-speed driving of the vehicle A.

In this case, the battery module 20 that is positioned on a front side, in the vehicle front-rear direction, of the battery assembly 200, is hit and is cooled by outside air that is taken in through the air inlet 16 due to rotation driving of the fan 26.

In this manner, the battery cooling structures 1, 1A, 1C, and 1D having the fan 26 and the motor 27 can obtain an effect similar to that provided in the case of being able to use travel wind, even in a situation in which no or insufficient travel wind is obtained, for example, during stop or low-speed driving of the vehicle A.

In the battery cooling structures 1, 1A, 1B, 1C, and 1D, the housing 18 may have a two-layer structure, and the inside of the two-layer structure may be used as a part of a cooling passage for allowing the heating medium to flow. This enables decreasing the number of parts and thereby reducing manufacturing cost.

The invention claimed is:

1. A cooling structure for a battery mounted on a vehicle, the cooling structure comprising:

a housing mounted on the vehicle;

a battery assembly provided in the housing and comprising a first battery module and a second battery module arranged along a front-rear direction of the vehicle, the second battery module being provided rearward of the first battery module in the front-rear direction;

a first air inlet of the housing provided forward of the battery assembly in the front-rear direction, the first air inlet being configured to allow outside air to flow from outside the housing toward inside the housing during traveling of the vehicle;

a second air inlet provided rearward of the battery assembly in the front-rear direction, the second air inlet being configured to allow air to flow from outside the housing toward inside the housing;

a heat exchanger provided in the housing and provided rearward of the second air inlet in the front-rear direction;

a fan provided in the housing and provided rearward of the heat exchanger in the front-rear direction, the fan being configured to cause air to flow from the second air inlet toward the heat exchanger;

a cooling passage comprising a first passage corresponding to the first battery module and a second passage corresponding to the second battery module, and configured (i) to communicate the first passage, the second passage, and the heat exchanger, and (ii) to circulate a heating medium for cooling the battery assembly between the first and second passages and the heat exchanger, the first and second passages being connected in series; and a pump configured to, in the cooling passage, cause the heating medium cooled by the heat exchanger to flow into the first passage after passing through the second passage.

2. The cooling structure according to claim 1, wherein the battery assembly comprises a third battery module provided rearward of the second battery module in the front-rear direction, wherein the cooling passage comprises a third passage corresponding to the third battery module, wherein the third passage is connected in series with the second passage between the second passage and the heat exchanger, and wherein the heating medium cooled by the heat exchanger returns to the heat exchanger after sequentially passing through the third passage, the second passage, and the first passage.

3. The cooling structure according to claim 2, further comprising a first passage plate in contact with the first battery module, a second passage plate in contact with the second battery module, and a third passage plate in contact with the third battery module, wherein the first passage plate comprises the first passage, wherein the second passage plate comprises the second passage, wherein the third passage plate comprises the third passage, and wherein the first passage, the second passage, and the third passage have the same shape.

* * * * *